United States Patent [19]

Shaw

[11] 4,280,395
[45] Jul. 28, 1981

[54] HYDRAULIC BRAKE BOOSTER

[75] Inventor: Arthur R. Shaw, Dayton, Ohio

[73] Assignee: General Motors Corporation, Detroit, Mich.

[21] Appl. No.: 68,895

[22] Filed: Aug. 23, 1979

[51] Int. Cl.³ .................... F15B 13/14; F15B 13/10
[52] U.S. Cl. .................................. 91/47; 91/391 R; 91/431; 91/434
[58] Field of Search ............... 91/431, 434, 47, 391 R

[56] References Cited

U.S. PATENT DOCUMENTS

| 3,093,119 | 6/1963 | Stelzer | 91/434 |
| 3,148,592 | 9/1964 | Schultz et al. | 91/431 |
| 3,353,451 | 11/1967 | Garrison et al. | 91/431 |
| 4,009,640 | 3/1977 | Takeuchi et al. | 91/47 |
| 4,181,064 | 1/1980 | Flory | 91/431 |

FOREIGN PATENT DOCUMENTS 1576148 6/1969 Fed. Rep. of Germany ............ 91/431

Primary Examiner—Paul E. Maslousky
Attorney, Agent, or Firm—D. D. McGraw

[57] ABSTRACT

The booster is installed downstream of a vehicle's power steering gear. The booster has a power piston and a valve seat piston reciprocably mounted in a bore of the booster housing. Hydraulic inlet pressure is introduced into the housing bore between these pistons and flows through a normally open poppet valve, which acts as a booster control valve. Movement of the booster input push rod restricts hydraulic fluid flow through the control valve and causes pressure to be built up in the power chamber between the pistons. The pressure acts on the power piston to move the booster output member. The pressure also holds the valve seat piston in position against the bore and wall so that it does not move during normal power boost operation. In the power mode brake pedal travel can be very low, permitting a high brake pedal ratio for the no-power operating mode.

2 Claims, 2 Drawing Figures

HYDRAULIC BRAKE BOOSTER

The invention relates to a hydraulic brake booster for operating a master cylinder assembly in a brake system. It more particularly relates to such a booster which operates with a very small amount of brake pedal travel during power boost operation, and is capable of having a high brake pedal ratio so that manual actuation of the master cylinder assembly by pushing through the booster can be accomplished without requiring extremely heavy brake pedal force loads.

Hydraulic brake boosters have been used for some years which have a valve seat forming a part of the control valve provided on the power piston or moving with that piston. The disclosure of U.S. Pat. No. 3,699,680—Shellhouse is an example of this type of brake booster. Such a booster requires controlling movement of the brake pedal which is directly related to the amount of booster output member movement. Other boosters have been used which have a lever mechanism permitting the controls to move a proportionally smaller distance than the power piston during normal power operation, but yielding so that the control moves during manual operation at a distance substantially equal to that traveled by the piston. Such boosters are exemplified by a U.S. Pat. No. 3,603,209—MacDuff and U.S. Pat. No. 3,625,112—Brown. Variable ratio brake pedal linkages are also well known, as exemplified by U.S. Pat. No. 3,858,457—Mathues; U.S. Pat. No. 3,911,760—Elbers et al; and U.S. Pat. No. 4,069,722—Derrick. These linkages typically modify the effective ratio of the brake pedal lever during its stroke from a brake release position to a full brake apply position. Other brake mechanisms have been proposed which utilize a zero or minimum travel brake pedal which is relatively low to the floor of the vehicle for power booster operation, and which have some type of device which raises the brake pedal to a higher level so that additional brake pedal travel is available for manual brake operation when power is no longer available. Examples of such brake booster mechanisms are illustrated in U.S. Pat. Nos. 3,093,120—Ayres, Jr.; 3,246,473—McCotter et al; 3,250,183—Gephart; and 3,250,184—De Hoff.

The mechanism embodying the invention has many of the advantages of a variable ratio mechanism as well as the zero brake pedal travel mechanism but is much simpler in concept and operation. A brake booster embodying the invention requires only nominal movement of the brake pedal during booster operation of the master cylinder assembly, and requires only slight movement to afford a complete closure of the control valve mechanism to thereafter provide a manual force transmitting path through the booster mechanism for manual operation of the master cylinder. Manual operation can occur either when there is no power pressure available at all, or can also occur when power runout has occured and additional actuating force on the master cylinder is required by the vehicle operator. In the latter situation, closure of the control valve operates to establish the pressurized hydraulic fluid in the power chamber as a hydraulic link through which additional manually induced brake master cylinder operational force is transmitted.

Figure 1:
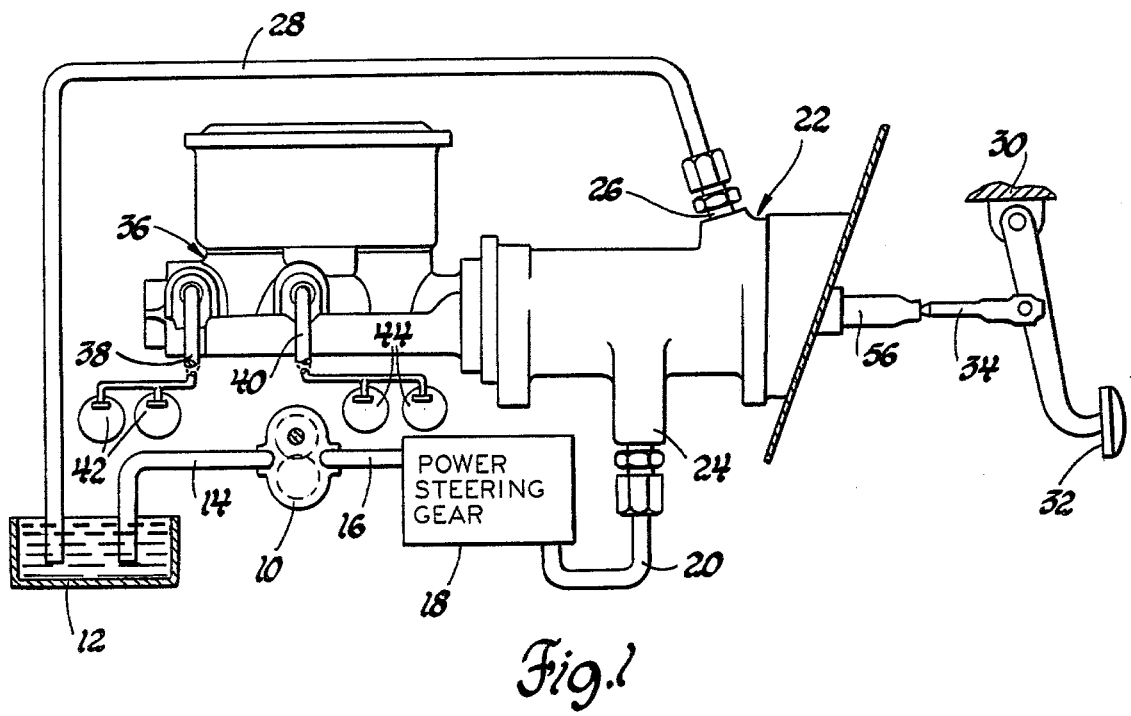
FIG. 1 is a schematic illustration of a hydraulic brake booster and power steering gear system with parts broken away and in section.

The system of FIG. 1 is schematically illustrated as including a power steering pump 10 which receives hydraulic fluid from a reservoir 12 through conduit or passage 14 and delivers the hydraulic fluid through conduit 16 to the power steering gear 18. Gear 18 is of the well known open center type so that the hydraulic fluid flows through the gear without any substantial restriction when the gear is not operating. The fluid then passes through conduit 20 to the hydraulic brake booster 22. Conduit 20 is connected to the booster inlet 24 for this purpose. Booster outlet 26 delivers hydraulic fluid from the booster through conduit 28, which returns it to the reservoir 12. Thereservoir 12 may be a physical part of the power steering pump 10, as is common practice.

The booster 22 is mounted on a suitable fixed portion 30 of the vehicle in which it is installed, as is the brake pedal 32. The brake pedal is connected to actuate the booster input push rod 34 in the usual manner. The output of the booster 22 is connected to the master cylinder assembly 36, which when actuated pressurizes hydraulic brake fluid in brake circuits 38 and 40. Circuit 38 is schematically illustrated as including the vehicle front wheel brakes 42, and circuit 40 is schematically illustrated as including the vehicle rear brakes 44. Other split circuit arrangements may also be used.

Figure 2:
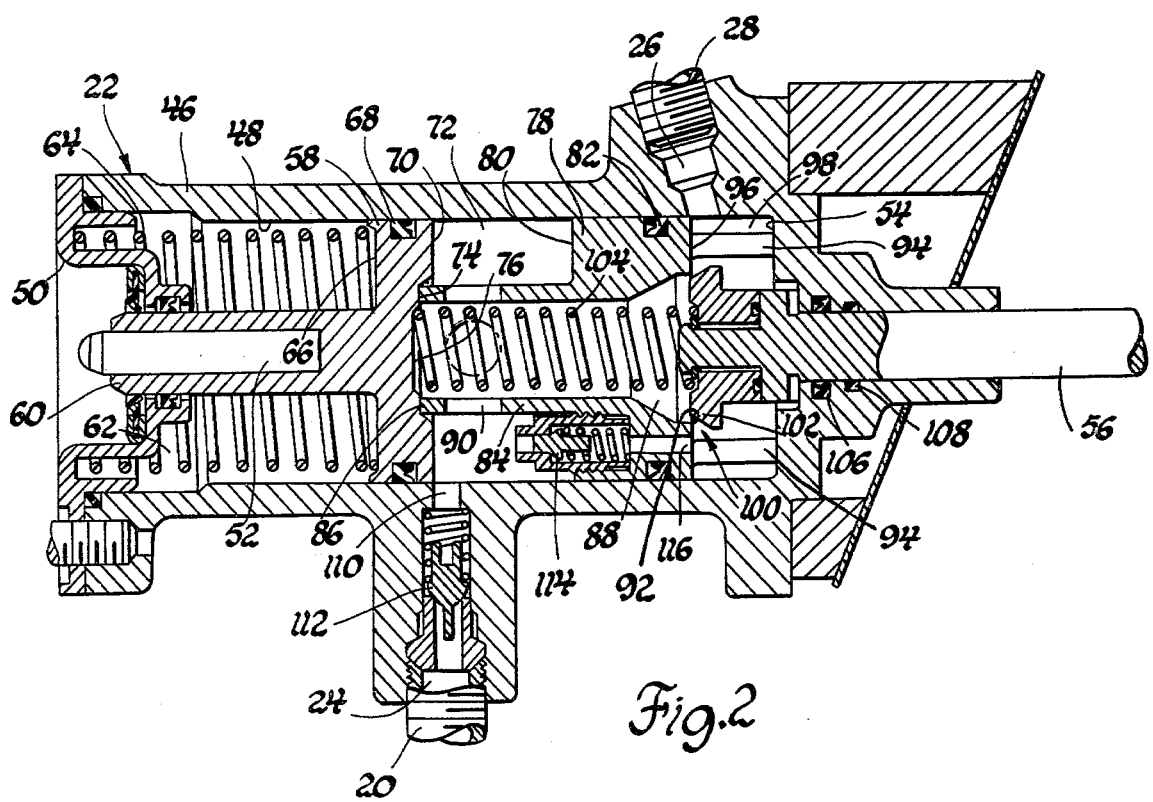
FIG. 2 is a cross-section view of the hydraulic brake booster of FIG. 1 and illustrates the brake booster embodying the invention.

The hydraulic brake booster 22 embodying the invention is illustrated in detail in FIG. 2. It includes a housing 46 having a bore 48 formed therein. The front portion of bore 48 is closed by an end cover 50 through which the booster output member 52 extends. The after end of bore 48 is formed with an end wall 54 through which the booster input member 56 sealingly and reciprocably extends. Input member 56 is suitably connected with the push rod 34 so as to be moved under control of the vehicle operator by operation of the brake pedal 32. A power wall 58, formed as a power piston, is reciprocably received in bore 48. The power wall 58 has a forwardly extending portion 60 which extends through the end cover 50 in sealing and reciprocal relationship. The booster output member 52 is received by and extends from portion 60. Output member 52 is operatively connected to a pressurizing piston in the master cylinder assembly 36, as is well known in the art. On the forward side of power wall 58 is a chamber 62 containing the power wall return spring 64. Spring 64 has one end acting on the forward face 66 of the power wall 58 and the other end acting on end cover 50. Spring 64 continually urges the power wall 58 rearwardly to the released position. A seal 68 on the outer periphery of the power wall 58 seals the power wall relative to the surface of bore 48 so that any pressure in the power chamber 72 will not leak into chamber 62. The rear face 70 of the power wall 58 forms the forward wall of the power chamber 72. The center portion of power wall rear face 70 is slightly recessed to provide a first abutment surface 74 and a second abutment surface 76.

A valve piston 78 is reciprocably received in bore 48 intermediate power wall 58 and the bore end wall 54. The forward face 80 of valve piston 78 forms the rear wall of the power chamber 72. A seal 82 on the outer periphery of valve piston 78 seals the piston relative to the surface of bore 48 so that any pressure in power chamber 72 will not leak into exhaust chamber 98. An extension 84 of valve piston 78 extending from the forward face 80 thereof has a forward end 86 which is engageable with abutment surface 74 of the power wall 58. A passage 88 is formed through valve piston 78 and its extension 84. Adjacent the forward end 86 of extension 84 one or more cross passages 90 provide continuous substantially unrestricted fluid communication between power chamber 72 and passage 88. The rear end of passage 88 is radially enlarged to some extent and the rear edge thereof defines a valve seat 92. Several legs 94 extend rearwardly from the rear face 96 of valve piston 78 and normally abut the bore end wall 54 as shown in FIG. 2. Legs 94 are somewhat similar to castellations so that they provide axial spacing of the valve piston 78 relative to the wall 54 while permitting relatively free hydraulic fluid passage between the valve piston rear face 96 and wall 54. This portion of bore 48 between the valve piston 78 and rear wall 54 defines the exhaust chamber 98 from which the booster outlet 26 delivers hydraulic fluid to conduit 28 as earlier described.

The control valve 100 includes the valve seat 92 and a valve element 102 secured to or formed as a part of the input member 56. Input member 56 extends through the exhaust chamber 98 and supports valve element 102 in valving relation with valve seat 92 to define the control valve 100 as an annular poppet valve controlling hydraulic fluid flow from power chamber 72 through passage 88 to the exhaust chamber 98. A spring 104 within passage 88 has its rear end acting on the valve element 102 to continually urge that element and input member 56 rearwardly. The forward end of spring 104 engages the abutment surface 76 of power wall 58. Suitable seals 106 and 108 in the rearward reduced diameter portion of bore 48 cooperate with the outer surface of input member 56 to prevent loss of hydraulic fluid from exhaust chamber 98 through the rear portion of the bore.

The brake booster inlet 24 communicates through a port 110 with the power chamber 72 through a check valve 112. Check valve 112 is arranged to open under very light hydraulic pressure so as to provide no substantial resistance to hydraulic flow. However, the check valve will close whenever the pressure in the power chamber 72 is substantially equal to or greater than the pressure being received from the power steering pump 10 through conduit 20 and inlet 24. A pressure limiting check valve 114 is positioned in a passage 116 formed through the valve piston 78 and is normally closed. Valve 114 is so positioned and arranged that it opens to limit to a predetermined desired maximum the pressure that can be introduced into power chamber 72 relative to the pressure in exhaust chamber 98. When the hydraulic pressure in chamber 72 exceeds the predetermined desired maximum value, valve 114 opens and bleeds off the pressure through passage 116 to the exhaust chamber 98 until the excess pressure no longer exists in the power chamber 72.

When the booster is in the released position and the power steering pump 10 is operating, hydraulic fluid is pumped with little pressure loss through the power steering gear 18 and the booster 22. When the vehicle operator operates the brake pedal 32 to actuate the vehicle brakes, slight movement of the brake pedal results in slight forward movement of push rod 34 and input member 56 so that valve element 102 approaches valve seat 92 and restricts or closes the control valve 100. This immediately causes a build-up of hydraulic pressure in power chamber 72, which acts on the forward face 80 of valve piston 78 and tends to hold the valve piston in the rearward position illustrated with the rear ends of legs 94 in engagement with bore rear end wall 54. The pressure also acts on the rear face 70 of the power wall 58, moving the power wall and therefore output member 52 forwardly against the force of piston return spring 54 to actuate the master cylinder assembly 36. The pressure also acts across the area of the forward end of input member 56 and valve element 102 to provide reaction to the vehicle operator. As power wall 58 moves forwardly, the end 86 of extension 84 is separated from the abutment surface 74 of the power wall since the valve piston 78 remains in rearward position. Thus the vehicle operator can control the amount of boost operation by controlling the amount of restriction established by control valve 100. This is done with minimal axial forward movement of valve element 102 and input member 56. The total amount of movement from the fully released position to the fully closed position of the control valve 100 may be a relatively small amount, on the order of sixty to one hundred-thousandths of an inch, for example. Thus the vehicle operator is required to move brake pedal 32 a very small amount to obtain any desired power operation of the brake booster 22.

If more master cylinder operational force is required than can be generated by the maximum determined pressure in power chamber 72, the vehicle operator only needs to move brake pedal 32 sufficiently to engage valve element 102 with valve seat 92. This will completely close control valve 100 and will trap hydraulic fluid in the power chamber 72 at no more than the predetermined maximum pressure value. Further operation of the brake pedal in a brake applying direction will cause the manual force to be transmitted from input member 56 and valve element 102 to valve piston 78, moving the valve piston forwardly so that it acts on the hydraulic link established by the trapped pressure in power chamber 72 to move power wall 58 forwardly to the same extent. This causes the booster output member 52 to move an additional amount equal to the amount of movement of the input member 56. The brake pedal 32 may be provided with a relatively high pedal ratio so that this movement can occur without high brake pedal force required to be exerted by the vehicle operator. Similarly, if there is no hydraulic pressure available, the input member 56 may be initially moved until valve element 102 engages valve seat 92, and the manual force is then transmitted mechanically through valve piston 78 and its extension 84 to the power wall 58 and therefore to the output member 52 to manually actuate the master cylinder assembly 36.

The embodiments of the invention in which an exclusive property or privilege is claimed are defined as follows:

1. A hydraulic power brake booster comprising:
   a housing having a bore therein;
   a power wall having a booster output member, said power wall being reciprocably received in said housing bore;
   a valve piston reciprocably received in said housing bore and defining a power pressure chamber in combination with said power wall and a part of said housing, said valve piston also defining an exhaust chamber on the opposite side thereof from said power pressure chamber in combination with another part of said housing;

an input member extending through said exhaust chamber in axial alignment with said valve piston and said power piston;

a control valve defined by an annular valve seat on said valve piston and a movable valve element on said input member and including a passage in said valve piston passing through said annular valve seat, said passage providing fluid communication between said power and exhaust chambers as controlled by said control valve;

a hydraulic fluid inlet in said housing for delivering hydraulic fluid to said power chamber upstream of said control valve and having a check valve therein for preventing fluid flow from said power chamber through said inlet, and a hydraulic fluid outlet in said housing for receiving hydraulic fluid from said exhaust chamber downstream of said control valve;

said booster being power actuated by movement of said input member to restrict hydraulic fluid flow through said control valve and cause power pressure to increase in said power pressure chamber, said power pressure moving said power wall and holding said valve piston against movement in the same direction as said power wall to require a small amount of input member movement to control said booster throughout its power range;

said booster being subject to manual push-through operation by movement of said input member which is sufficient to engage said movable valve element with said annular valve seat and thereafter move said valve piston and said power wall concurrently to move said output member as said input member is moved.

2. A hydraulic power brake booster comprising:

a housing having a bore therein;

a power wall having a booster output member, said power wall being reciprocably received in said housing bore;

a valve piston reciprocably received in said housing bore and defining a power pressure chamber in combination with said power wall and a part of said housing, said valve piston also defining an exhaust chamber on the opposite side thereof from said power pressure chamber in combination with another part of said housing;

an input member extending through said exhaust chamber in axial alignment with said valve piston and said power piston;

a control valve defined by an annular valve seat on said valve piston and a movable valve element on said input member and including a passage in said valve piston passing through said annular valve seat, said passage providing fluid communication between said power and exhaust chambers as controlled by said control valve;

a hydraulic fluid inlet in said housing for delivering hydraulic fluid to said power chamber upstream of said control valve and having a check valve therein for preventing fluid flow from said power chamber through said inlet, and a hydraulic fluid outlet in said housing for receiving hydraulic fluid from said exhaust chamber downstream of said control valve;

said booster being power actuated by movement of said input member to restrict hydraulic fluid flow through said control valve and cause power pressure to increase in said power pressure chamber, said power pressure moving said power wall and holding said valve piston against movement in the same direction as said power wall to require a small amount of input member movement to control said booster throughout its power range;

said booster being subject to manual push-through operation by movement of said input member which is sufficient to engage said movable valve element with said annular valve seat to prevent fluid communication between said power and exhaust chambers and thereafter move said valve piston therewith to act through hydraulic fluid then trapped in said power pressure chamber to move said power wall and said output member as said input member is moved.

* * * * *